No. 687,246. Patented Nov. 26, 1901.
J. R. MADAN.
VARIABLE SPEED GEAR FOR CYCLES, &c.
(Application filed July 14, 1900.)
(No Model.) 3 Sheets—Sheet 1.

WITNESSES:

INVENTOR
James Russell Madan
BY
ATTORNEYS

No. 687,246. Patented Nov. 26, 1901.
J. R. MADAN.
VARIABLE SPEED GEAR FOR CYCLES, &c.
(Application filed July 14, 1900.)
(No Model.) 3 Sheets—Sheet 2.
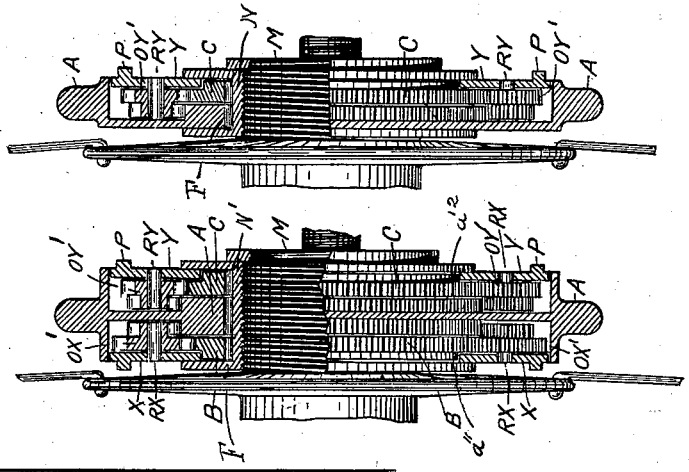
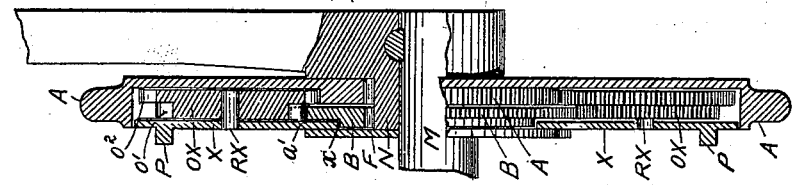
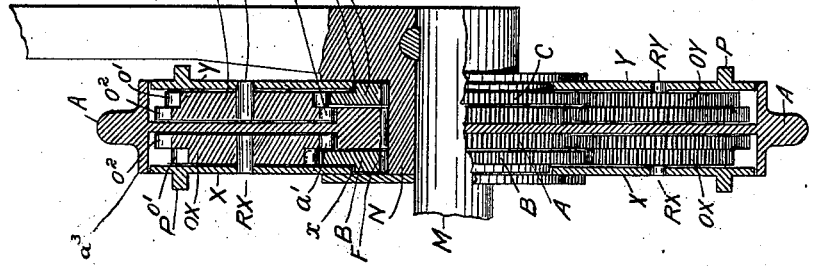
WITNESSES:
INVENTOR
James Russell Madan
BY
Richardson
ATTORNEYS No. 687,246. Patented Nov. 26, 1901.
J. R. MADAN.
VARIABLE SPEED GEAR FOR CYCLES, &c.
(Application filed July 14, 1900.)
(No Model.) 3 Sheets—Sheet 3.

WITNESSES:

INVENTOR

ATTORNEYS

UNITED STATES PATENT OFFICE.

JAMES RUSSELL MADAN, OF SALISBURY, ENGLAND.

VARIABLE-SPEED GEAR FOR CYCLES, &c.

SPECIFICATION forming part of Letters Patent No. 687,246, dated November 26, 1901.

Application filed July 14, 1900. Serial No. 23,612. (No model.)

*To all whom it may concern:*

Be it known that I, JAMES RUSSELL MADAN, a subject of the Queen of Great Britain and Ireland, and a resident of Downton, Salisbury, in the county of Wilts, England, have invented certain new and useful Improvements in Variable-Speed Gear for Cycles, Motor-Vehicles, and the Like, (for which I have made application in Great Britain, dated May 5, 1900, No. 8,340,) of which the following is a specification.

My invention relates to variable-speed gear for cycles, motor-vehicles, and the like, and has for its object to provide a compact and simple variable-speed gear of the free-wheel type which may by slight modifications be constructed to give two or three speeds by the simple locking of one or more parts thereof.

A driving mechanism made in accordance with my invention comprises a driven or driving wheel, hereinafter called the "sprocket-wheel," normally adapted to drive or to be driven by the axle through suitable clutch or free-wheel mechanism. The said sprocket-wheel is connected by a toothed rim or rims thereon and suitable intermediate and normally free-running and inoperative double spur-wheels to a toothed ring or rings disposed on one or both sides of said sprocket-wheel or disposed concentric with one another and the sprocket-wheel and axle. These rings also are adapted to drive the rings concentric therewith or the axle through suitable clutch mechanism. The parts described are arranged in such manner that while the sprocket-wheel normally drives or is driven by the axle the locking of the intermediate double spur-wheel axles or the frame or plate carrying same on one or both sides of the sprocket-wheel will cause the sprocket-wheel to communicate its power through the said spur-wheels and one or more of the rings to the axle and drive the latter at a higher speed, varying with the proportion of parts. For effecting the locking of the parts necessary for varying the gear I may employ locking-bolts, as hereinafter described.

I will now describe my invention in reference to the accompanying drawings, in which—

Figure 1:
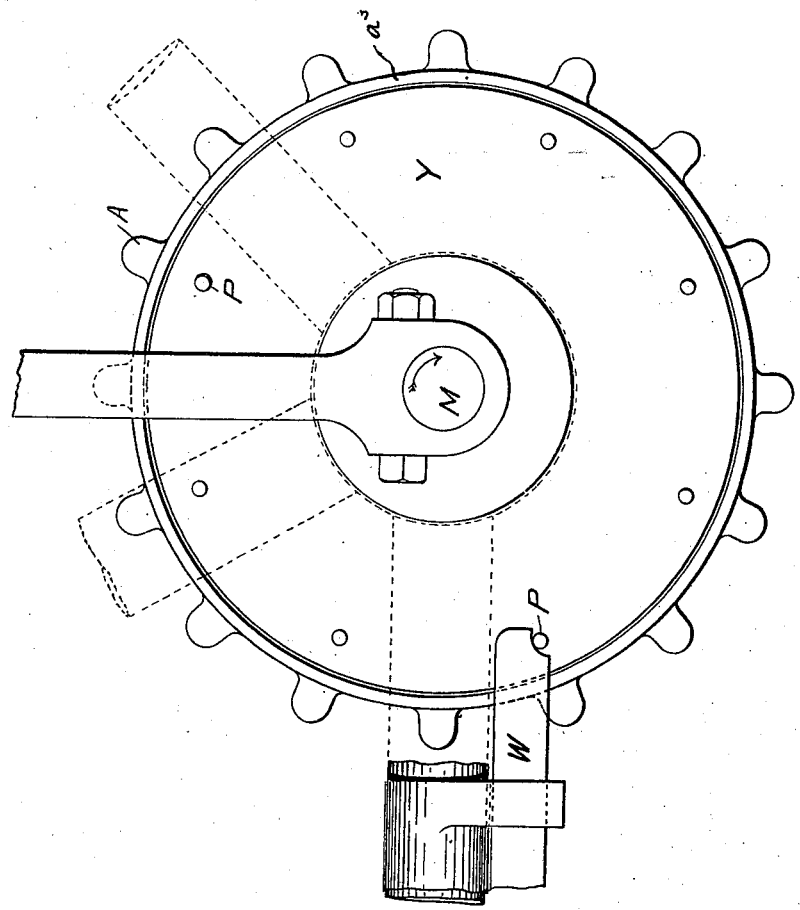
Figure 6:
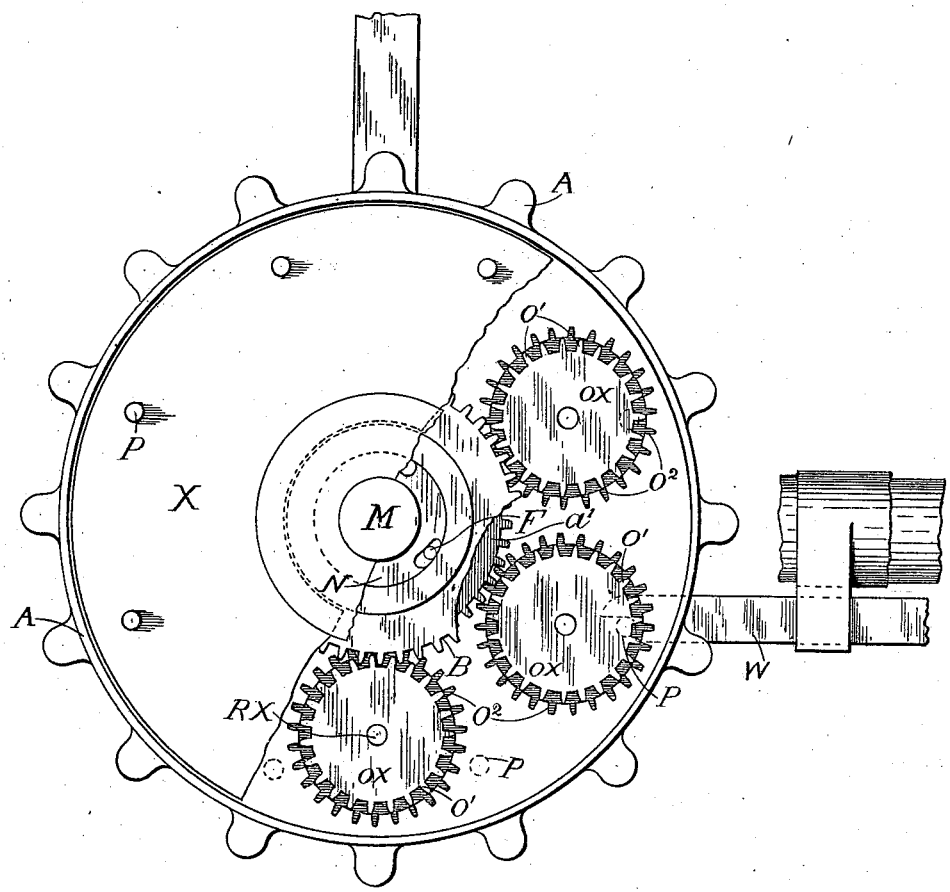

Figure 1 is a side elevation of a three-speed gear as applied to the driving sprocket-wheel of a cycle. Fig. 2 is a section of Fig. 1 with part of the gear-wheels shown in full. Fig. 3 is a similar view to Fig. 2 of a two-speed gear. Figs. 4 and 5 are similar views to Figs. 2 and 3, showing the invention as applied to the driven sprocket or back hub of a cycle. Fig. 6 is a side elevation, partly broken away, of my improved gear as arranged for three speeds.

Referring now to Figs. 1 and 2, a collar or sleeve N is fixed to the hub or axle and supports the sprocket-wheel A and two toothed rings B and C, one on either side thereof. Each of these three parts A B C is mounted upon said sleeve N and adapted to receive power therefrom in one direction only through the medium of a clutch or free-wheel mechanism, such as F, of the roller or other type. Two side plates X and Y are also provided, adapted to run free on ball or other bearings $x$ and $y$, respectively, upon the sleeve or rings referred to, and these plates X and Y carry fixed studs RX and RY, acting as axles for two series of rotating double spur-wheels OX and OY. The outer halves $o'$ of the double spur-wheels on each side gear with the rings B and C, while the inner halves $o^2$ gear with externally-toothed rims $a'$ $a^2$ upon the sprocket-wheel A. The sprocket-wheel A is necessarily the lowest gear, and the outer half $o'$ of the double spur-wheels will be smaller than the inner half $o^2$ if on a driving-axle, as in Figs. 1, 2, and 3, and the larger of the two if on a driven axle, as in Figs. 4 and 5. The diameters of the toothed rims $a'$ $a^2$ on either side of the sprocket will be such as to gain the increase of gear required.

In the construction shown in Figs. 1, 2, and 3 the axle M and sleeve N are in operation and drive the sprocket-wheel A when both the side plates X and Y and their double spur-wheels OX and OY are running free; but by locking or preventing the rotation of either of the side plates X or Y the power is at once diverted through the free rings B or C and double spur-wheels OX or OY to the toothed rims $a'$ or $a^2$ and sprocket-wheel A, and thus a gear can be obtained higher than that provided for by the sprocket-wheel A, the said free rings B or C when in use overrunning and releasing the clutches F of the sprocket-wheel A.

Referring now to the operation of a gear so constructed and arranged as shown in Figs. 4 and 5, the sprocket-wheel A is in operation and drives the sleeve N' and axle M when both the side plates X and Y and their double spur-wheels OX' and OY' are running free; but by locking or preventing the rotation of either of the side plates X and Y the power is at once diverted through their double spur-wheels OX' and OY' from the toothed rims $a^{11}$ or $a^{12}$ or the sprocket-wheel A and to one of the free rings B or C and the axle M, and thus a gear can be obtained higher than that provided for by the sprocket-wheel A, the said free rings B and C when in use over-running and releasing the clutches F of the sprocket-wheel A.

The rim $a^3$ of the sprocket-wheel may conveniently be extended laterally, as shown, so as to partially inclose the gear-wheels and where required the side plates also, or the side plates may be carried up, so as to form part of a casing for the wheel. Where two speeds only are required, one of the side gears and rings may be dispensed with, as shown in Fig. 3, the remaining parts being appropriately formed as shown or otherwise conveniently.

The bolts W for locking the side plates are disposed upon the lower bracket or other convenient position and are adapted to be moved forward when released or operated and engage a notch or projection P on the side plates X and Y. These bolts may be operated by suitable connecting levers, wires, or rods from a conveniently-disposed handle, and in some cases they may be spring-operated. In connection with the three-speed gear (shown in Figs. 1, 2, and 4) the bolts may be arranged for alternate operation only.

Speed-gears constructed as above are very compact, light, and simple and are adapted for alteration by operation of the bolts or the handle controlling same, as described, to any of the gears or the reversing motion, as arranged for in the construction, and at the same time whatever gear is in use the free-wheel mechanism is always available.

The improved speed-gear can be readily fitted to existing machines. When the low gear is in use, no additional friction of any kind is produced. Further, by fixing two such gears, for instance, to chain-driven axles—one upon the driving and another upon the driven axle—increased variations in gear can be obtained.

The different speeds are obtained by the variation in the diameter of the outer halves of the spur-wheels OX and OY. For instance, in Fig. 2 the outer half o' of the spur-wheel OY is smaller than the half $o^2$ of the same wheel, but larger than the corresponding half o' of spur-wheel OX. In operation spur-wheel OX will give the high speed and the spur-wheel OY an intermediate speed while if neither of the spur-wheels are in use the sprocket-wheel A will be driven direct from axle M and a third speed will result, this being the lowest speed. Figs. 4 and 5 are similar in action, with the exception that as the power is applied to the sprocket-wheel A instead of axle M the construction of spur-wheels OX' and OY' is reversed—i. e., the outer half o' being larger.

Having now described my invention, what I claim as new, and desire to secure by Letters Patent, is—

1. The improved variable-speed gear comprising a sprocket-wheel and a toothed ring connected independently to an axle by one-direction clutch mechanism, a set of double spur-wheels gearing with the said toothed ring and a toothed rim on the sprocket-wheel, a normally free running plate carrying the axles of said spur-wheels, and means for locking said plate to and unlocking said plate from a fixed position substantially as and for the purposes set forth.

2. The improved variable-speed gear comprising a sprocket-wheel and two toothed rings connected independently to the axle by a one-direction clutch mechanism, independent sets of double spur-wheels, each set gearing with one of said rings and a toothed rim on the sprocket-wheel, one set of the double spur-gears having radii varying in dimensions from the radii of the other set, plates carrying the axles of said spur-wheels and mounted so as to be normally free running but adapted to be locked to and unlocked from a fixed position substantially as and for the purposes set forth.

3. The improved variable-speed gear comprising the combination with the axle of a sprocket-wheel, one-direction clutch mechanism between same and the axle, a toothed rim on the sprocket, a set of double spur-wheels, the inner halves of which gear with said toothed rim, and a toothed ring upon the axle at the side of the sprocket gearing with the other halves of said set of double spur-wheels, one-direction clutch mechanism between said toothed ring and the axle, a suitable side plate carrying the axles of said double spur-wheel and normally running free, and suitable means for locking said side plate to and unlocking the same from a fixed position substantially as and for the purposes set forth.

4. The improved variable-speed gear comprising the combination with an axle of a sprocket-wheel, suitable one-direction clutch mechanism between said sprocket-wheel and the axle, toothed rims on the sprocket, a set of double spur-wheels one on each side of said sprocket-wheel the inner halves of which gear with the said toothed rims thereon, one set of the double spur-gears having radii varying in dimensions from the radii of the other set, toothed rings disposed upon the axle at each side of the sprocket-wheel and gearing with the outer halves of said double spur-wheels, suitable one-direction clutch mechanism between said toothed rings and the axle, side plates carrying the axles of said double spur-wheels and normally running free, and means for locking said side plates to and unlocking the same from a fixed position substantially as and for the purposes set forth.

In witness whereof I have hereunto signed my name in the presence of two subscribing witnesses.

JAMES RUSSELL MADAN.

Witnesses:
HENRY ALLEN PRYOR,
HENRY HART.